United States Patent
Chiang et al.

[11] Patent Number: 5,934,639
[45] Date of Patent: Aug. 10, 1999

[54] UNIVERSAL BRACKET FOR CASTER ATTACHMENT TO WIRE FABRICATED COMPONENTS

[75] Inventors: Peter Chiang, Changhua; Tally Yuan, Taipei, both of Taiwan; John Gusdorf, St. Louis; Fred D. Oberhaus, Ballwin, both of Mo.

[73] Assignee: John Gusdorf and Associates, Ltd., St. Louis, Mo.

[21] Appl. No.: 08/891,551

[22] Filed: Jul. 11, 1997

Related U.S. Application Data

[60] Provisional application No. 60/021,643, Jul. 12, 1996.

[51] Int. Cl.$^6$ ...................................................... A47B 91/00
[52] U.S. Cl. ............................................ 248/346.11; 16/30
[58] Field of Search ........................... 248/346.11, 352, 248/188.9; 16/29, 31 R, 43, 30, 21; 206/513

[56] References Cited

U.S. PATENT DOCUMENTS

| | | | |
|---|---|---|---|
| 600,452 | 3/1898 | Sheeler | 16/30 |
| 1,530,116 | 3/1925 | Hawkins | 5/98.3 |
| 1,532,064 | 3/1925 | Neiswender | 16/21 |
| 3,082,879 | 3/1963 | Wilson | 211/126.8 |
| 3,452,386 | 7/1969 | Carlson | 16/39 |
| 3,463,505 | 8/1969 | German et al. | 280/79.2 |
| 3,478,381 | 11/1969 | Schultz | 16/29 |
| 3,523,694 | 8/1970 | Oliver | 280/33.998 |
| 3,528,635 | 9/1970 | Nightingale | 248/188.9 |
| 4,079,836 | 3/1978 | Von Stein et al. | 206/513 |
| 4,146,139 | 3/1979 | Von Stein et al. | 211/126.9 |
| 4,494,271 | 1/1985 | Perlin et al. | 16/21 |
| 4,576,391 | 3/1986 | Gerstner | 280/79.1 R |
| 4,725,822 | 2/1988 | Hooley | 340/568 |
| 4,754,885 | 7/1988 | Rich | 211/132.1 |
| 5,069,309 | 12/1991 | Swiderski et al. | 182/119 |
| 5,152,407 | 10/1992 | Massoudnia et al. | 211/126.15 |
| 5,253,389 | 10/1993 | Colin | 16/30 |
| 5,634,240 | 6/1997 | Brokaw | 16/30 |
| 5,727,284 | 3/1998 | Deutsch | 16/30 |
| 5,737,801 | 4/1998 | Flood | 16/30 |
| 5,745,951 | 5/1998 | Waner | 16/31 R |

FOREIGN PATENT DOCUMENTS

| | | |
|---|---|---|
| 842929 | 7/1960 | United Kingdom . |
| 2174295 | 11/1986 | United Kingdom . |

*Primary Examiner*—Leslie A. Braun
*Assistant Examiner*—Tan Le
*Attorney, Agent, or Firm*—Paul M Denk

[57] ABSTRACT

A universal bracket incorporating upper and lower components, the upper and lower components may be connected by a plastic hinge, or separate, with each component containing cooperating locking means to provide for permanency in their interconnection together, for supporting a downwardly depending caster, when the universal bracket is applied to a wire fabricated product, such as a basket, cart, shelf, or other type of item of furniture fabricated from wire components.

15 Claims, 3 Drawing Sheets

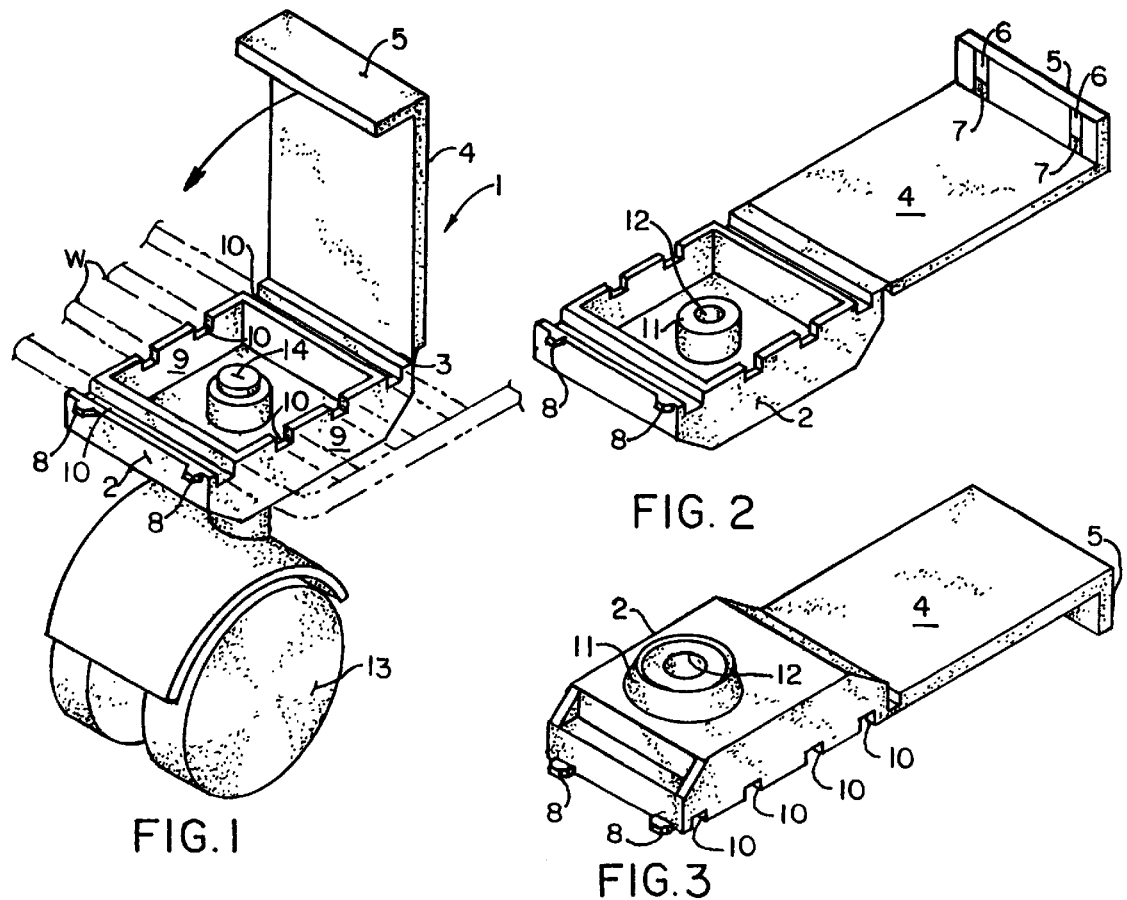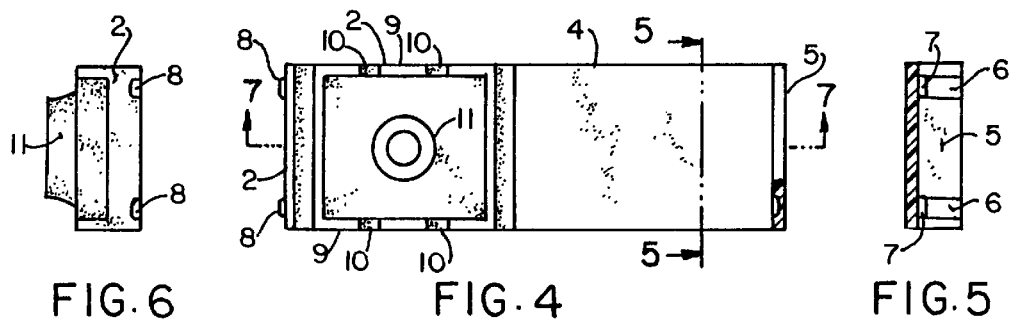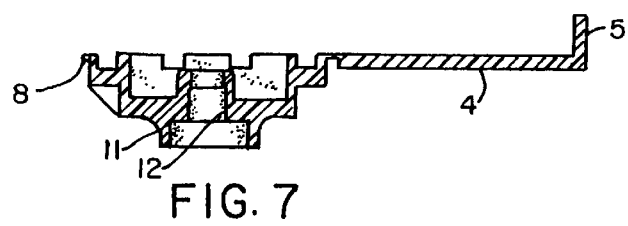

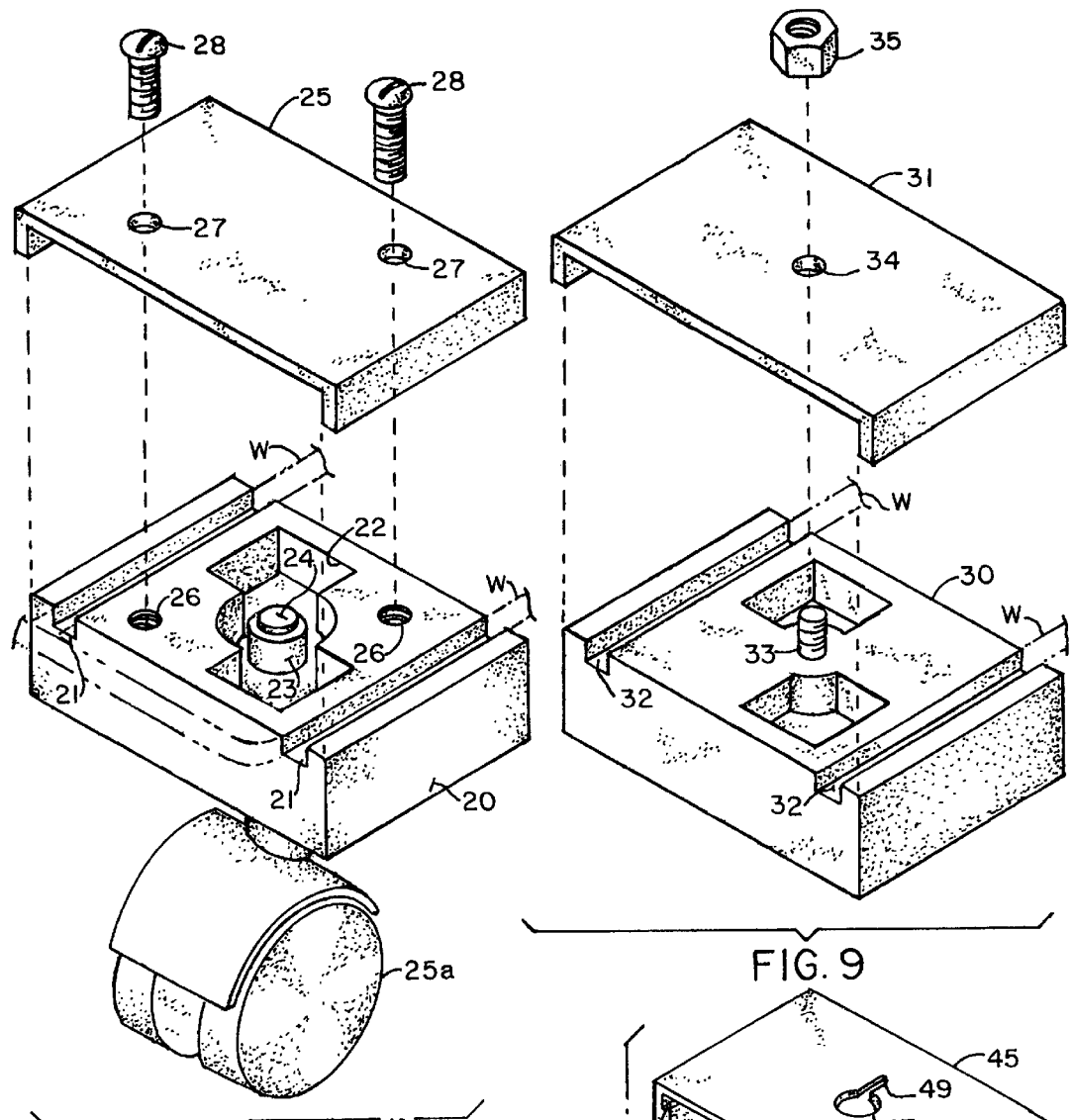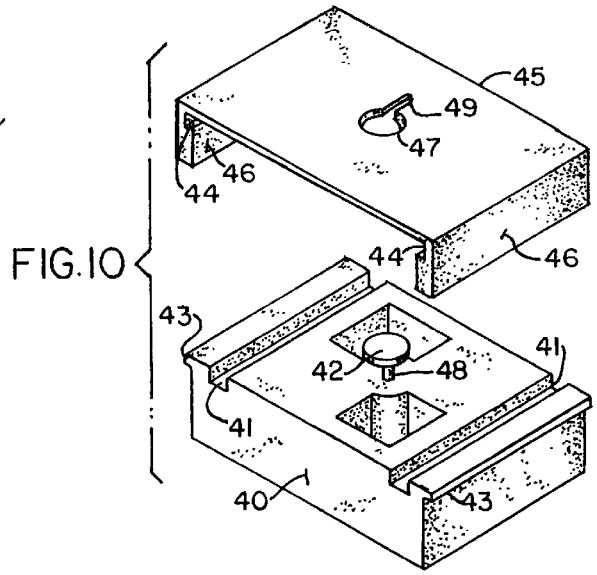

UNIVERSAL BRACKET FOR CASTER ATTACHMENT TO WIRE FABRICATED COMPONENTS

This is a provision of application Ser. No. 60/021,643 filed Jul. 12, 1996.

BACKGROUND OF THE INVENTION

There are a variety of caster arrangements that have been fabricated for addition to fruniture, consoles, servers, and the like, in addition to casters that are applied to the lower segments of chairs, strollers, and other related items of furniture and the like. In most instances, the casters are designed for specific application to an individual piece of furniture, and normally, such casters simply pressure insert within bores provided within the underside of the furniture legs, and the like, in order to facilitate their installation.

Casters or rollers have been applied to wire type products, but generally, they simply are bolted in placed, for the specific installation, and are not capable of being applied to a variety of wire fabricated products, regardless of their design, through the use of a universal type of bracket as devised for this current invention. Examples of the application of casters or rollers to wire fabricated products can be seen in the U.S. Pat. No. 5,152,407, that issued to an affiliated assignee to that of this current invention.

Other prior art known to the applicants include the United States patent to Hawkins, No. 1,530,116, which discloses a caster, for use upon a carriage, which in this particular instance, is mounted to a lower clamp, while the upper clamp is hingedly connected thereto, and which clamps are then held in position once they are embraced around its frame member by means of a wing nut fastener. The U.S. Pat. to Wilson, No. 3,082,879, discloses a caster applied to the bottom of its wire receptacle. U.S. Pat. No. 4,079,836, discloses also casters affixed to the bottom pan of a series of vertically stacked wire racks. A similar type of design is shown in U.S. Pat. No. 4,146,139.

The British patent to Smith, No. 842,929, discloses means for interlocking an upper block with a lower bracket, by means of a clamp, and for holding a caster in place. Another British patent to Vollberg, No. 2174295A, shows another form of clamping means, for clamping about a pair of wires, and wherein the journal for the caster has clamp members that secure thereon, by means of a nut, and which clamp around the wires to secure the caster to any type of wire product, such as a cart, trolley, or the like.

SUMMARY OF THE INVENTION

It is the principal object of this invention to provide a caster, of standard design, that may be readily attached to and supported by a universal type of bracket that is capable of securement to wire fabricated products, of miscellaneous design.

This invention contemplates the formation of a bracket, and its various modifications, that allows for the ready installation in an application of the bracket, and its supported caster, to wire fabricated products, and provides expediency in the application of the bracketed caster to such products during their assembly line fabrication.

The bracket of this design, and in its various modifications, generally includes a base portion, which is designed to provide substantial support and structural strength to the finished bracket, and which has interconnected therein, whether by snap fastening, or through the use of fastener means, of a caster of standard design. The lower portion of the bracket normally incorporates various designed slots, that are intended to accommodate the arrangement of at least a pair of wires of the wire fabricated product, within their formed grooves, in order to add to the facility of attachment of the bracketed caster to the wire product, during a quickly performed assembly step. In its first embodiment, the lower component of the bracket includes a plastic hinge, along one edge, and provides for its easy fold over, as a top fastening component of the bracket, for securement of the bracket into an integral structure, for readily holding the bracketed caster to the lower reaches of the wire fabricated product, during its final assembly. In a second embodiment, the upper component of the bracket may be separate, and provide for its independent lowering onto the bottom component of the bracket, after it has been attached to the wire fabricated product, with the top component of the bracket being secured in place by means of fastening means, such as screws, or the threaded segment of the caster shaft that extends through the bracket, and tightened in place, during its assembly. A third embodiment for the upper component of the fabricated bracket includes the use of a series of barbed connectors, which when the upper component of the bracket is slid downwardly, for engagement with its lower component, the barbed connectors engage the bottom of the lower bracket component, and readily secure the bracket in place, embracing at least a pair of the wires of the wire fabricated product, during its assembly. Finally, a fourth modification to the universal bracket includes upper and lower bracket components, that have designed slots and grooves provided thereon, for accommodating at least a pair of the wires of the wire fabricated product therein, the upper and lower components of the bracket are then brought together by fastening means, such as a threaded attachment means provided at the upper end of the caster shaft, tightened in position by means of a nut, for securing the bracket about the wire components of the wire fabricated product, during its final assembly. Regardless which modification of the universal bracket is used, in the final assembly, the bracket is rigidly fastened to at least a pair of the wires of the wire fabricated product, in order to secure the bracket in place, and hold it there, for many years of usage.

The type of wire fabricated products suggested for use with the bracket of this invention includes wire shelving, wire baskets, and any of the other type of wire fabricated products that are customarily used, currently, either for storage purposes, in the home, or in commerce, or those types of wire formed products that are currently used in the assembly of closet organizers, that are applied for adding additional and convenient storage space within a closet, for the benefit of the home owner.

It is, therefore, an object of this invention to provide a universal type of bracket, for supporting the caster, and which may be quickly and facilely applied to wire fabricated products, such as shelving, baskets, and the like.

Another object of this invention is to provide a universal bracket that incorporates its own integral hinge to facilitate its ready installation and clamping into securing position about component wires that form various types of storage furniture, and the like.

Yet another object of this invention is to provide a multicomponent bracket that may be quickly and easily assembled, locked into position about wire components, such as of shelving, baskets, and the like, in order to provide for ease and promptness in the attachment of casters to such wire fabricated components during their assembly line fabrication.

Still another object of this invention is to provide a universal form of bracket that may be attached to wire products, and thoroughly and rigidly secure a caster in place, during assembly.

Still another object of this invention is to provide a caster bracket that may be readily removed from the wire product, simply upon the disengagement of select fastening means, during disassembly, such that might occur as when casters need to be replaced, after extended usage.

Still another object of this invention is to provide means to facilitate the construction of rolling wire products, through the application of a universal type of bracketed caster, as of this design, which casters add mobility to wire products fabricated as carts, baskets, under-the-bed drawers, shelves, and the like.

These and other objects will become more apparent to those skilled in the art upon reviewing the summary of the invention provided herein, and upon undertaking a study of the description of the preferred embodiments, in view of the drawings.

BRIEF DESCRIPTION OF THE DRAWINGS

In referring to the drawings, FIG. 1 is an isometric view of the bracketed caster of this invention being applied to wire shelving, the latter being disclosed in phantom line;

FIG. 2 discloses the universal bracket of this invention, in its opened position;

FIG. 3 is a bottom view of the universal bracket of FIG. 2;

FIG. 4 is a top view of the universal bracket disclosed in FIG. 2;

FIG. 5 is a sectional view of the upper component of the universal bracket taken along the line 5—5 of FIG. 4;

FIG. 6 is left end view of the universal bracket as shown in FIG. 4;

FIG. 7 is a sectional view of the universal bracket of FIG. 4, taken along the line 7—7 of FIG. 4'

FIG. 8 is a modified form of universal bracketed caster, exploded in view, showing its attachment to a wire fabricated product, the latter being disclosed in phantom line;

FIG. 9 is an exploded view of a further modified universal bracket of this design;

FIG. 10 is an exploded view of a firther form of universal bracket of this invention, showing a bayonet lock style of means for engagement between the upper and lower components of the said bracket;

DESCRIPTION OF THE PREFERRED EMBODIMENTS

Figure 12:
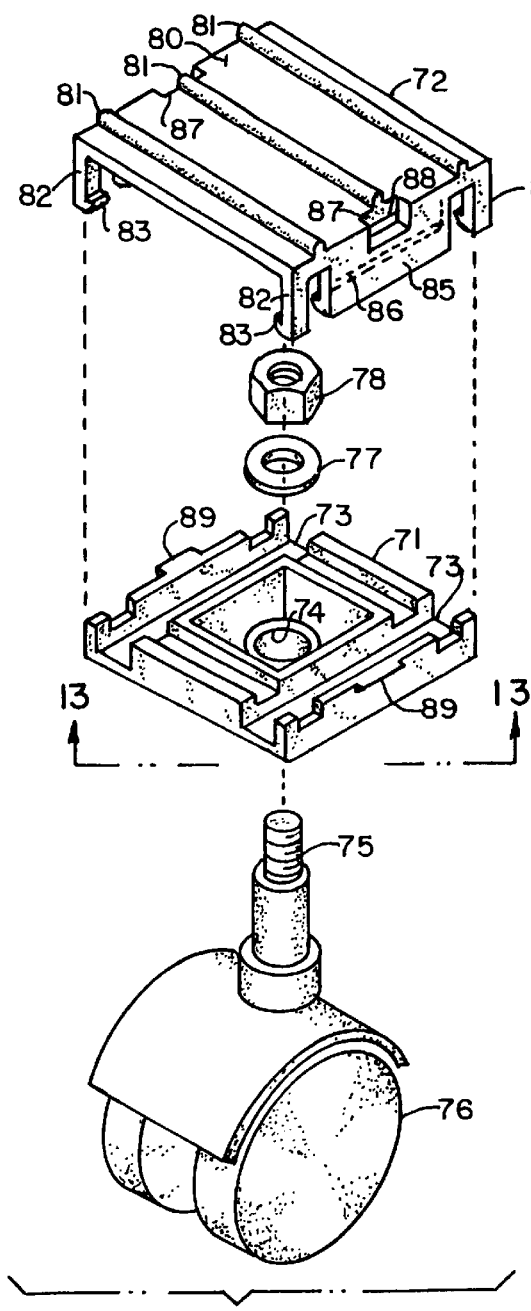
FIG. 12 shows a further modified universal bracket of this invention, in exploded view, showing how the caster attaches to the lower component of the bracket, and the upper component of the bracket lowers into a barbed interconnection between said components when assembling the bracket about a wire fabricated product.

In referring to the drawings, and in particular FIG. 1, the universal bracket 1 of this invention is readily disclosed. This bracket includes a lower bracket component 2, that is hingedly connected by means of a plastic hinge 3, to an upper bracket component 4. The upper bracket component 4 has a front flange 5, as noted, with the front flange, internally thereof, having a pair of grooves 6, with the innermost portion of the grooves having indentations, as at 7, which are designed for accommodating the insertion therein of the tabs 8, provided at the front of the lower bracket component 2. See FIG. 2. The lower bracket component includes a pair of side walls 9, and provided through the upper edges of said side walls 9 are a series of grooves or slots, as noted at 10, and these slots and grooves are designed for accommodating the insertion of the wire components W of any wire fabricated product, such as a cart, basket, shelf, and the like, so that when the upper bracket component 4 is folded over, about its plastic hinge 3, it will snugly embrace the wires W therein, and retain the same as such, after the upper and lower components have been tightened into closure. This closure is effected when the tabs 8 slide through the grooves 6, until such time as they project within the slots 7, in order to lock the upper and lower components of the universal bracket together, for embracing about the wires W of the wire fabricated device, as noted.

The bottom bracket component 2 also includes an integral boss 11, which is provided with a bore 12 there through, and which boss provides substantial structural support for the insertion and retention of a caster 13 thereto, particularly when the caster shaft 14 is press fitted within the boss 11, through its aperture 12, as can be seen in FIG. 1. Obviously, these various components for the universal bracket are fabricated such that they will tightly secure together, when interlocked about the wires W of a wire fabricated product, and at the same time, will snugly and tightly interfit the caster shaft 14 therein, for its securement, and reasonably permanent retention, during continuous and repeated usage of the wire formed product.

A modification to this universal bracket is disclosed in FIG. 8, and as can be seen therein, the lower bracket component 20 is designed having formed slots 21 provided there through, and arranged within these slots are the wires W of a wire fabricated product, during attachment of the bracketed caster thereto. The central portion of the lower component for the bracket includes counterbore or cavity, as at 22, and arranged therein is an integral boss 23, that is designed for accommodating within its centrally arranged bore the shaft 24 of the caster 25a, as noted. The reason for the counterbore 22 is to provide clearance for securement of the caster to the lower bracket component 20, and to provide for flush mounting of the upper bracket component 25 thereon, during its assembly. As can be seen, threaded bores, as at 26, are provided within the lower bracket component 20, and in addition, apertures, as at 27, are provided through the upper bracket component 25, to accommodate the insertion of fastener means, such as the threaded screws 28, there through, and for their securement within the lower bracket component 20, to secure the entire universal bracket together, and for tightly embracing the wires W of the wire fabricated product therein, during its assembly.

FIG. 9 shows a further modification to the universal bracket of this invention. As disclosed, the lower bracket component 30 is designed for accommodating the tight fitting of the upper bracket component 31 thereon, while the lower bracket includes at least a pair of slots 32 there through, for accommodating the insertion of the wire W therein, when the castered bracket is applied to a wire fabricated product. In this particular instance, it is the threaded caster shaft 33 that inserts through aperture 34 formed in the upper component 31, with a fastening means, such as an acorn nut, or other securement means 35 threadily connecting therewith, in order to secure the caster in place, and to tighten its bracket about the wire fabricated product, as can be noted.

Yet another modification to this invention is shown in FIG. 10. In this instance, the caster (not shown) may insert into the bottom, by pressure fit, of the shown lower bracket component 40. This lower component 40 includes at least a pair of slots 41, for arrangement of the wires W of a wire fabricated component, as aforesaid. At the center of the lower bracket component is a flanged pin 42, that extends upwardly for some distance, as noted. The outer upper edges of the lower bracket component 40 provide a series of elongated ribs, as at 43, and these ribs are designed for being accommodated within the corresponding and mating grooves 44 of the upper bracket component 45, when it is slide fitted onto the lower bracket component 40. Essentially, during its assembly, the upper bracket component 45 will be press fitted downwardly onto the lower bracket component, its outer flanges 46 will press slightly outwardly, to accommodate the eventual snap insertion of the ribs 43 within its grooves 44, until such time as the upper bracket component 44 is fully fitted onto the lower bracket component 40, and the flanged pin 42 extends through the corresponding aperture 47 of the upper component. At such time, the two components can be interlocked together, by further sliding of the upper bracket component 45 laterally upon the lower component 40, and the pin portion 48 locates within the slot 49 of the component 45. In that instance, the two components will be interlocked together, and the upper bracket component cannot be removed, because the flange 42 of the flanged pin will prevent an upward pulling to the component 45, once installed.

Figure 11:
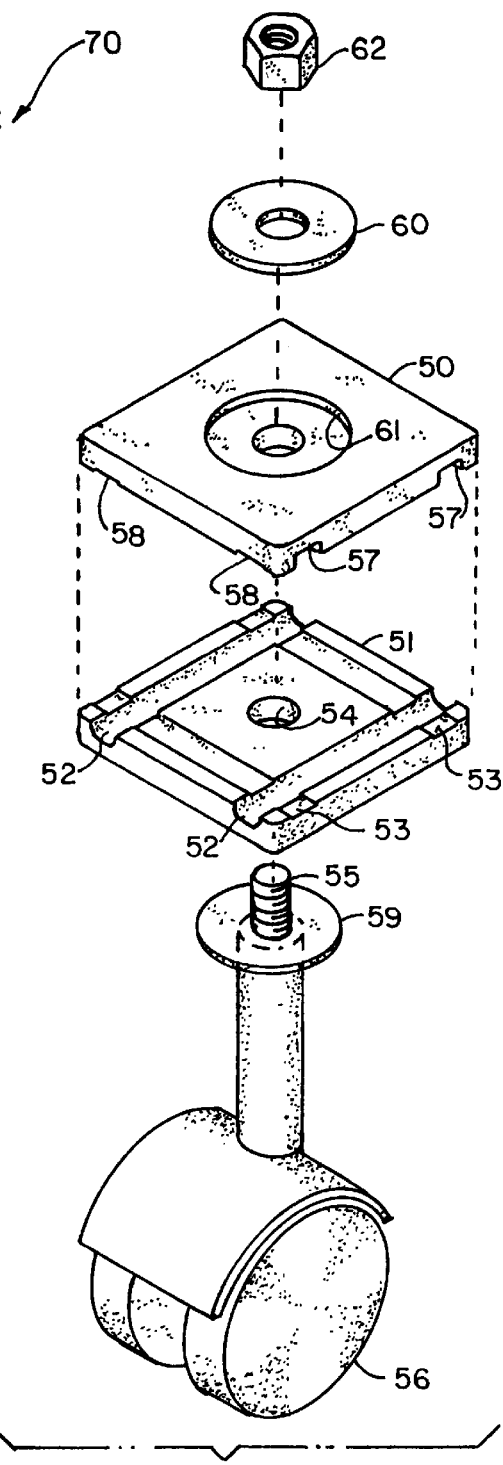
FIG. 11 is an exploded view of a further modified form of universal bracket that interconnects with a caster during securement of the bracketed caster to a wire fabricated product.

A further modification to this invention is shown in FIG. 11. As noted, the universal bracket of this invention includes upper and lower components 50 and 51, respectively. The lower bracket component, upon its upper surface, includes at least a pair of formed grooves, as at 52, and in addition, includes a pair of perpendicularly arranged shallow slots 53, for reasons to be described. The lower bracket component includes an aperture there through, as at 54, and this is designed for providing for the insertion of the threaded shaft 55 of the caster 56, during installation of this universal bracket to a wire fabricated product. The upper bracket component 50 is a mirror image of the lower bracket component 51. As noted, it also includes a pair of grooves 57, in addition to a pair of perpendicularly aligned shallow slots 58. Thus, when a pair of the wires of the wire fabricated product are located within the grooves 52 of the lower bracket component 51, the upper bracket component 50 is lowered in place, with its shallow slots 58 being aligned with the grooves 52, in order to provide slight clearance for any weldments that may be provided upon the wires of the wire fabricated component, but at the same time, to provide for their snug interfitting therein, to furnish their firm securement, without looseness, when the castered bracket is attached thereto. As can be further seen, a pair of washers 59 and 60 are designed for fitting within their corresponding counterbores 61 provided upon the outer surfaces of the upper and lower bracket components 50 and 51, and a fastening means, such as a nut, or acorn nut, as disclosed at 62, may be threadedly connected to the threaded end 51 of the caster, to tightly secure the universal bracket, and its caster, in place, upon the wire fabricated product.

Figure 13:
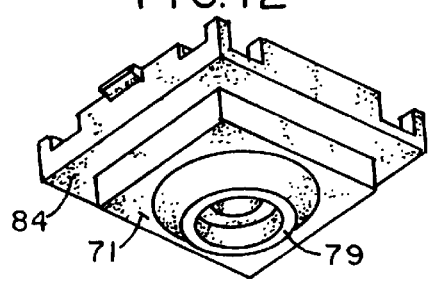
FIG. 13 is an isometric view of the lower component of the bracket, taken along the line 13—13 of FIG. 12.

A final modification to this invention is disclosed in FIGS. 12 and 13. The universal bracket 70 is disclosed, having a lower bracket component 71, and an upper bracket component 72. The lower bracket component includes at least a pair of parallel slots 73, and these slots are designed for accommodating a pair of the wires of the wire fabricated product snugly therein. The lower bracket component includes a central aperture as at 74, and this is designed for accommodating the insertion of the threaded portion 75 of the caster 76 there through, which may be tightened into position by means of the insertion of a washer 77, and a fastening nut 78 tightly into position, to secure the caster to the lower component of the universal bracket. As can be seen, the lower bracket component 71, upon its bottom surface, includes a tapered boss 79, to add reinforcement to the mounted caster, once it has been installed.

The upper bracket component 72 includes a top surface 80, which is applied with integral ribs 81, for the purpose of adding reinforcement to this component. Extending downwardly from each corner of the upper bracket component 72 is an integral leg 82, and these legs include a barbed segment 83, with these barbs designed for insertion, under pressure, against the underside 84 of the lower bracket component 71, in order to secure these upper and lower bracket components together. In addition, it can be seen that the integral side walls 85 of the upper component 72 also include inwardly extending barbs, as at 86, and these also are designed for biasing tightly against the undersurface 84 of the lower bracket component, in order to connect and secure these two components together, once the universal bracket is fastened into position, for attachment of its caster to the underside of a wire fabricated product.

It can also be seen that the upper bracket component 72 includes a cut-out portion 87, and which has a clearance slot 88, at each end, that extends interiorly of the component 72. These clearance slots are designed for accommodating the insertion therein, once the upper and lower components are snapped together into closure, of the integral tabs 89 that extend from either side of the lower bracket component 71, as can be noted. This assures the permanency in the interconnection between the upper and lower bracket components, for guaranteeing the permanent interconnection of these components together, and the attachment of the caster to the wire fabricated product, once assembled.

Variations or modifications to the subject matter of this invention may occur to those skilled in the art upon reviewing the description of the invention, and its various modifications, as provided herein. Such variations or modifications, if within the spirit of this disclosure, are intended to be encompassed within the scope of the invention described herein.

Having thus described the invention, what is claimed and desired to be secured by Letters Patent is:

1. A caster bracket for use in combination with shelving, or other furniture, comprising a pair of bracket components, an upper bracket component and a lower bracket component, fastening means for securing the bracket components together, the lower bracket component having a boss integrally formed therewith, a bore formed through said boss, a caster and a caster shaft, the caster shaft operatively extending through said boss bore for securement of said caster to the bracket, a hinge means integrally formed between the upper and lower bracket components, said hinge means formed along one side edge of each of said upper and lower bracket components, providing for the pivotal opening of the upper bracket component with respect to the lower component, and said upper and lower bracket components securing with said shelving or other furniture to support said caster into position therebelow, and facilitate the roller movement of the shelving or other furniture to other locations.

2. The universal bracket of claim 1 and wherein said fastening means for holding the upper and lower bracket components together includes at least one tab extending from the opposite side of a bracket component, and disposed for engagement with the opposite side edge of the other bracket component, to secure the upper and lower bracket components into closure and attachment with the associated shelving or other furniture.

3. The universal bracket of claim 1 wherein said boss extends downwardly from the lower surface of the lower bracket component.

4. The universal bracket of claim 1 wherein said boss extends inwardly interiorly of the lower bracket component.

5. The universal bracket of claim 1 wherein said fastening means includes at least one threaded aperture provided within one of said upper and lower bracket component, the other bracket component having at least one aperture provided therethrough, and the fastening means including at least one screw securing within the threaded aperture of the one of said upper and lower bracket component to secure the upper and lower bracket components together during attachment of the universal bracket to shelving or other furniture.

6. The universal bracket of claim 1 wherein said fastening means includes the upper end of said caster shaft being threaded, the upper end of said caster shaft extending through the upper bracket component, and a nut securing onto the threaded upper end of the caster shaft to secure the upper and lower bracket components together for their securement to shelving or other furniture.

7. A caster bracket for use in combination with shelving, or other furniture, comprising a pair of bracket components, an upper bracket component and a lower bracket component, fastening means for securing the bracket components together, the lower bracket component having a boss integrally formed therewith, a bore formed through said boss, a caster and caster shaft, the caster shaft operatively extending through said boss bore for securement of said caster to the bracket, and said upper and lower bracket components securing with said shelving or other furniture to support said caster into position there below, said caster shaft having an upward extension, said upward extension being threaded, said upward extension inserting through the boss means aperture and into the lower bracket component, nut means threadedly engaging with the threaded upper extension of the caster shaft, for securement of the caster to the lower bracket component, the upper bracket component having a series of connecting means, said connecting means grasping the side edge of the lower bracket component during attachment of the two bracket components together, during installation, while embracing the shelving or other furniture there between during installation, and facilitate the roller movement of the shelving or other furniture to other locations.

8. The universal bracket of claim 7, and wherein said lower bracket component along its upper surface includes a series of slots therein, said slots designed for location of the shelving wires therein during attachment of the caster means to said shelving or other furniture.

9. A caster bracket for use in combination with shelving, or other furniture, comprising a pair of bracket components, an upper bracket component and a lower bracket component, fastening means for securing the bracket components together, the lower bracket component having a boss integrally formed therewith, a bore formed through said boss, a caster and caster shaft, the caster shaft operatively extending through said boss bore for securement of said caster to the bracket, and said upper and lower bracket components securing with said shelving or other furniture to support said caster into position there below, said caster shaft incorporates an upper integral extension, said extension being threaded, said caster extension designed for insertion through the boss aperture, said upper bracket component having an aperture therethrough, said threaded extension extending through said upper bracket component aperture, nut means engaging said threaded extension, and designed for securing the upper and lower bracket components together, and locating of the wires of the shelving therein for attachment of the caster to said shelving or other furniture, and facilitate the roller movement of the shelving or other furniture to other locations.

10. The universal bracket of claim 9 and wherein the upper surface of the lower bracket component having a series of slots formed therealong, said slots provided for accommodating the wires of the shelving therein during attachment of the upper and lower bracket components together.

11. The universal bracket of claim 10 including the lower surface of the upper bracket component having a series of slots formed therein, and said slots designed for accommodating the insertion of the wires of the shelving therein during attachment of the upper and lower bracket components together when secured with said shelving or other furniture.

12. A caster bracket for use in combination with shelving, or other furniture, comprising a pair of bracket components, an upper bracket component and a lower bracket component, fastening means for securing the bracket components together, the lower bracket component having a boss integrally formed therewith, a bore formed through said boss, a caster and caster shaft, the caster shaft operatively extending through said boss bore for securement of said caster to the bracket, said upper and lower bracket components securing with said shelving or other furniture to support said caster into position therebelow, said fastening means securing the upper and lower bracket components together includes at least one tab extending from opposite side edges of one of the bracket components, and detent means, in the form of at least a slot, formed of the opposite side edges of the other bracket component, so as to provide for engagement of the tabs within the detent means slots for securing the upper and lower bracket components together and for providing for their embracing of shelving or other furniture components during caster installation, and to facilitate the roller movement of the shelving or other furniture to other locations.

13. A caster bracket for use in combination with shelving, or other furniture, comprising a pair of bracket components, an upper bracket component and a lower bracket component, fastening means for securing the bracket components together, the lower bracket component having a boss integrally formed therewith, a bore formed through said boss, a caster and caster shaft, the caster shaft operatively extending through said boss bore for securement of said caster to the bracket, and said upper and lower bracket components securing with said shelving or other furniture to support said caster into position therebelow, at least one of the upper and lower bracket components includes a series of aligned slots, said shelving being formed of wire, and the aligned slots of the upper and lower bracket components providing for embracement and location therein of the wire structure of the shelving, and to provide for securement of the shelving therein during attachment of the upper and lower bracket components together, and to facilitate the roller movement of the shelving or other furniture to other locations.

14. A caster bracket for use in combination with shelving, or other furniture, comprising a pair of bracket components, an upper bracket component and a lower bracket component, fastening means for securing the bracket components together, the lower bracket component having a boss integrally formed therewith, a bore formed through said boss, a caster and caster shaft, the caster shaft operatively extending through said boss bore for securement of said caster to the bracket, and said upper and lower bracket components securing with said shelving or other furniture to support said caster into position there below, said caster shaft having an upper integral extension, a flange means connecting with the upper end of said extension, the upper bracket component having an aperture therein to provide for clearance for locating of the caster shaft flange means therethrough, there being a slot communicating with the said aperture, and said slot designed for embracing the upper extension of the caster shaft, and securement of the flange means thereon, for attachment of the upper and lower bracket components together and providing for their securement with shelving or other furniture during installation, and facilitate the roller movement of the shelving or other furniture to other locations.

15. A caster bracket for use in combination with shelving, or other furniture, comprising a pair of bracket components, an upper bracket component and a lower bracket component, fastening means for securing the bracket components together, the lower bracket component having a boss integrally formed therewith, a bore formed through said boss, a caster and caster shaft, the caster shaft operatively extending through said boss bore for securement of said caster to the bracket, and said upper and lower bracket components securing with said shelving or other furniture to support said caster into position there below, said fastening means includes a series of tabs, extending laterally from the lower bracket component, and said tabs designed for inserting within slots formed interiorly of the upper bracket component, for engaging said upper and lower bracket components together when secure with shelving or other furniture, and facilitate the roller movement of the shelving or other furniture to other locations.

\* \* \* \* \*